United States Patent [19]

Wang et al.

[11] Patent Number: 5,144,556
[45] Date of Patent: Sep. 1, 1992

[54] METHOD AND SYSTEM FOR RETAINING ACCESS TO DELETED DOCUMENTS IN A DATA PROCESSING SYSTEM

[75] Inventors: Diana S. Wang, Trophy Club; Marvin L. Williams, Lewisville, both of Tex.

[73] Assignee: International Business Machines Corporation, Armonk, N.Y.

[21] Appl. No.: 534,814

[22] Filed: Jun. 7, 1990

[51] Int. Cl.⁵ ................... G06F 15/38; G06F 15/00
[52] U.S. Cl. ................................. 364/419; 395/145
[58] Field of Search ..................... 364/419, 900, 200; 380/3, 4, 24, 25

[56] References Cited

U.S. PATENT DOCUMENTS

| 4,503,499 | 3/1985 | Mason et al. | 364/200 |
| 4,532,588 | 7/1985 | Foster | 364/200 |
| 4,799,156 | 1/1989 | Shavit et al. | 364/408 |
| 4,899,299 | 2/1990 | MacPhail | 364/518 |

Primary Examiner—Roy N. Envall, Jr.
Assistant Examiner—Xuong Chung
Attorney, Agent, or Firm—Andrew J. Dillon

[57] ABSTRACT

A method is disclosed for retaining access to deleted documents in a data processing system. In a data processing system multiple documents may be stored and accessed by a plurality of users. Each user may be authorized a particular access authority to a document which limits the activities that user may undertake with regard to that document. In accordance with the method of the present invention any user having access authority to a document may designate that document as a retained document. Thereafter, any attempted deletion of that document by the owner thereof will result in the retention of the document for those users who have designated it as a retained document. Further, any attempted alteration of the user's access authority for that document which results in a denial of future access will result in the automatic creation of a copy of that document with the user's original access authority. In this manner a user, having once been granted access authority to a document, may elect to designate that document as a retained document and thereby assure continued access to that document despite an attempted deletion of the document or an alteration of the user's access authority.

10 Claims, 3 Drawing Sheets

DOCUMENT A

| USER ID | ACCESS AUTHORITY | USER TYPE |
|---------|------------------|-----------|
| BILL | ALL | OWNER |
| SAM | UPDATE | RETAINER |
| SUE | UPDATE | RETAINER |
| ART | READ | RETAINER |
| ANN | READ | RETAINER |
| TOM | READ | USER |

*Fig. 3*

DOCUMENT A

| USER ID | ACCESS AUTHORITY | USER TYPE |
|---------|------------------|-----------|
| BILL | ALL | OWNER |
| SAM | READ | RETAINER |
| ANN | READ | RETAINER |
| TOM | READ | USER |

*Fig. 4*

DOCUMENT B

| USER ID | ACCESS AUTHORITY | USER TYPE |
|---------|------------------|-----------|
| SUE | UPDATE | RETAINER |
| ART | READ | RETAINER |

*Fig. 5*

DOCUMENT A

| USER ID | ACCESS AUTHORITY | USER TYPE |
|---------|------------------|-----------|
| SAM | READ | RETAINER |
| ANN | READ | RETAINER |

*Fig. 6*

METHOD AND SYSTEM FOR RETAINING ACCESS TO DELETED DOCUMENTS IN A DATA PROCESSING SYSTEM

BACKGROUND OF THE INVENTION

1. Field of the Invention

The present invention relates in general to methods of improving data processing systems and in particular to methods for assuring continued access to a document by a particular user. Still more particularly the present invention relates to methods for permitting a user to retain access to a document which has been deleted from a data processing system by the owner thereof.

2. Description of the Prior Art

It is common within known data processing systems to group a plurality of data objects or documents within a library service so that these data objects may be utilized and/or temporarily removed by users within the system. As is typical in these known systems, the ability of a particular user to utilize or temporarily remove a particular data object is selectively defined by setting forth a level of authority which that user may enjoy with regard to a particular data object.

For example, a particular user may be authorized to read a particular document but not to copy or delete that document. However, in the case of each document within a data processing service, a particular user designated as the owner of that document, or a user given the highest level of authority with regard to that document, may specify that a particular document be deleted from the library service wherein that document is maintained.

This particular activity can create a problem in known data processing system environments in that a document owner or a user with sufficient authority may request that a document be detected and have the library service responsible for that document delete the document, regardless of whether the document is in use or temporarily removed from the library service by a second user. In the case of a document which has been temporarily removed, known library services will delete all references to that document and an error message will be generated upon an attempt by a second user to check the document back into the library service. Of course, those skilled in the art will appreciate that the deletion of a document by the document owner while the document is sin use by a second user will clearly have a negative impact on data integrity and perceived user-friendliness within the data processing system.

Therefore, it should be obvious that a need exists for a method whereby a user who is authorized to access a particular document may designate that document as a retained document so that it may continue to be accessed by that user despite an attempted deletion of that document by the owner thereof or an attempted revocation of the users' access authority for that document.

SUMMARY OF THE INVENTION

It is therefore one object of the present invention to provide a method of improving data processing systems.

It is another object of the present invention to provide an improved method for assuring continued access to a document by a user within a data processing system.

It is yet another object of the present invention to provide an improved method for permitting a user to retain access to a document within a data processing system which has been deleted by the owner thereof.

The foregoing objects are achieved as is now described. In a data processing system multiple documents may be stored and accessed by a plurality of users. Each user may be authorized a particular access authority to a document which limits the activities that user may undertake with regard to that document. In accordance with the method of the present invention any user having access authority to a document may designate that document as a retained document. Thereafter, any attempted deletion of that document by the owner thereof will result in the retention of the document for those users who have designated it as a retained document. Further, any attempted alteration of the user's access authority for that document which results in a denial of future access will result in the automatic creation of a copy of that document with the user's original access authority. In this manner a user, having once been granted access authority to a document, may elect to designate that document as a retained document and thereby assure continued access to that document despite an attempted deletion of the document or an alteration of his or her access authority.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a pictorial representation of the status of a document which is accessible by multiple users;

FIG. 4 is a pictorial representation of the status of the document of FIG. 3 after an alteration of access authority for selected users;

FIG. 5 is a pictorial representation of an automatically created copy of the document of FIG. 3 after an alteration of access authority for that document; and FIG. 6 is a pictorial representation of the status of the document of FIG. 4 after an attempted deletion of that document by the owner thereof.

DETAILED DESCRIPTION OF THE INVENTION

Figure 1:
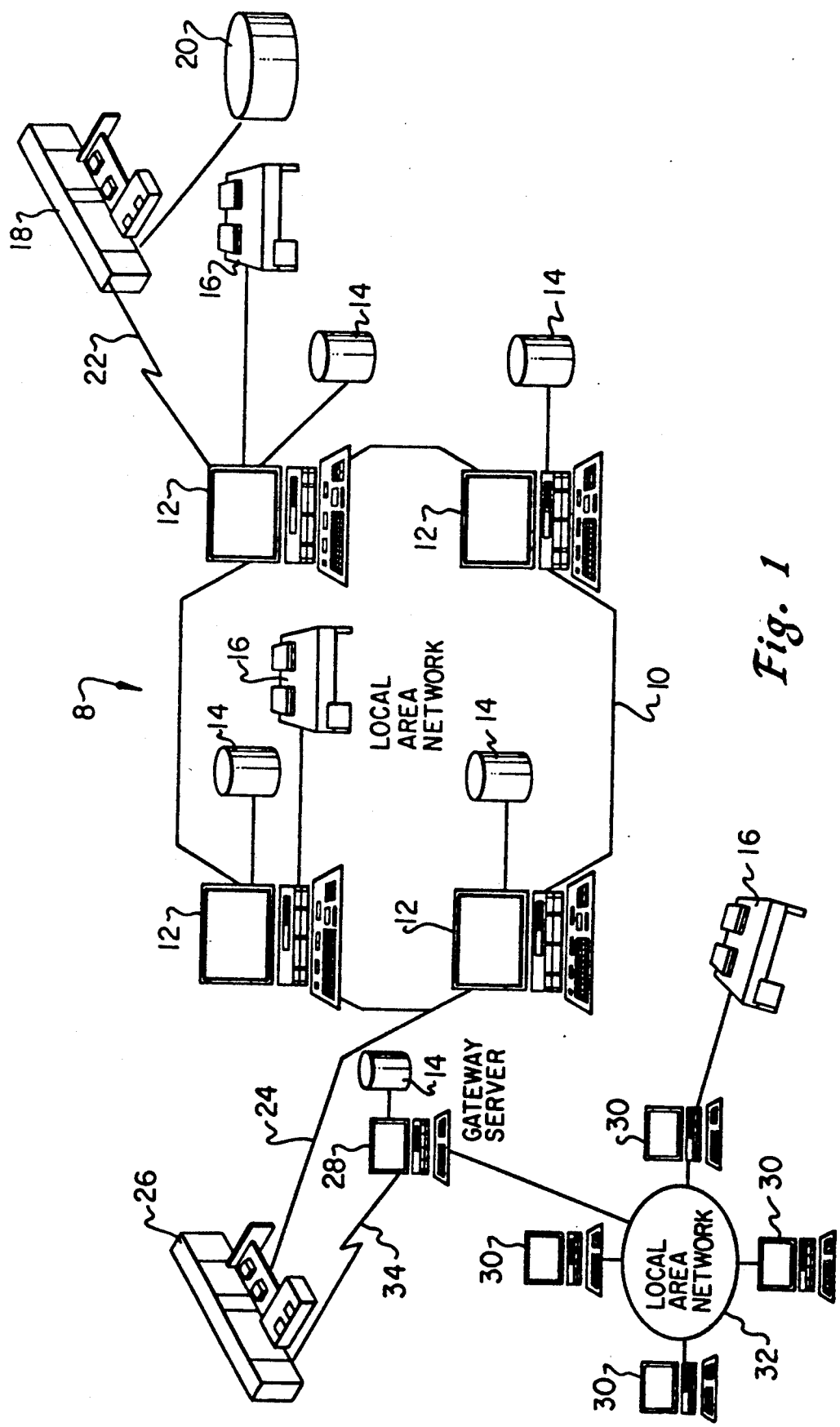
FIG. 1 is a pictorial representation of a distributed data processing system which may be utilized to implement the method of the present invention.

With reference now to the figures and in particular with reference to FIG. 1, there is depicted a pictorial representation of a data processing system 8 which may be utilized to implement the method of the present invention. As may be seen, data processing system s may include a plurality of networks, such as Local Area Networks (LAN) 10 and 32, each of which preferably includes a plurality of individual computers 12 and respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance With the method of the present invention, to store the various data objects or documents which may be periodically accessed and processed by a user within data processing system s, in accordance with the method of the present invention. In a manner well known in the prior art, each such data object or document may be stored within a storage device 14 which is associated with a Resource Manager or Library Service, which is responsible for maintaining and updating all resource objects associated therewith.

Still referring to FIG. 1, it may be seen that data processing network may also include multiple mainframe computers, such as mainframe computer 18, which may be preferably coupled to Local Area Network (LAN) 10 by means of communications link 22. Mainframe computer 18 may also be coupled to a storage device at which may serve as remote storage for Local Area Network (LAN) 10 may be coupled via communications controller 27 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data objects or documents may be stored within storage device 20 and controlled by mainframe computer 18, as Resource Manager or Library Service for the data objects and documents thus stored. Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a data object or document stored in another portion of data processing network 8. In order to maintain a semblance of order within the documents stored within data processing network 8 it is often desirable to implement an access control program. As discussed above, this is generally accomplished by listing those users authorized to access each individual data object or document, along with the level of authority that each user may enjoy with regard to a document. In this manner the authority to order the deletion of a selected document may be restricted to a single user, or a limited number of users.

However, as those skilled in the art will appreciate, the deletion of a particular document which is stored within data processing network 8 by the owner of that document, or a user with sufficient authority, may result in problems in data integrity and conflicts between users when a data object is in use by a second user or temporarily removed from a library service during the period of time when the owner requests a deletion of that document. Therefore, it should be obvious that a need exists for a method whereby a user may retain access to a document which has been deleted by the owner thereof from a data processing system.

Figure 2:
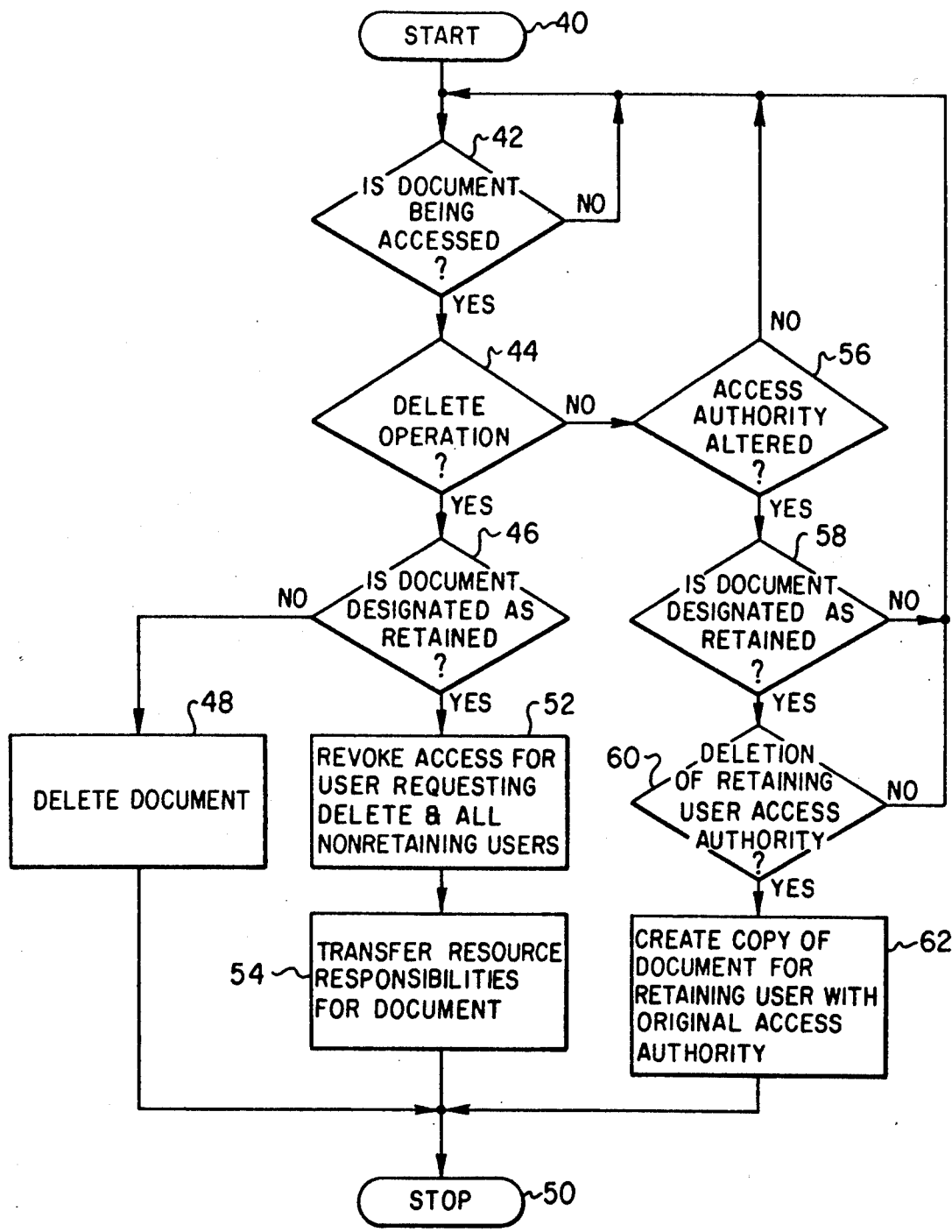
FIG. 2 is a high level flowchart depicting the steps of the method of the present invention.

Referring now to FIG. 2, there is depicted a high level flowchart which illustrates the steps of the method of the present invention. As is depicted, the process begins at block 40 and thereafter passes to block 42 which illustrates a determination of whether or not a document within the data processing system is being accessed. As utilized herein, the term "document" shall mean any collection of data stored within a data processing system. If a document is not being accessed, then the process returns iteratively to block 42 to await such an event. However, in the event a document is being accessed within the data processing system, the process passes to block 44 which illustrates a determination of whether or not the operation taking place with regard to the document being accessed is a "delete" operation. That is, an activity which will delete all references to the document from the library service responsible for that document within the data processing system.

In the event a document is being accessed and the activity with regard to that document is a delete, as determined in blocks 42 and 44, then block 46 illustrates a determination of whether or not the document being deleted has been designated as a "retained" document for any user within the data processing system. If not, block 48 illustrates the deletion of all reference to that document and the process terminates, as illustrated in block 50.

Returning again to block 46, in the event the document being accessed for a delete activity has been designed as a retained document by a user within the data processing system, then block 52 illustrates the revocation of access to that document for the user who has requested the delete and for all nonretaining users who have had access to that document. Thereafter, block 54 illustrates the transfer of the resource responsibility for that document.

As those skilled in the art will appreciate, the resource responsibility for a document which has been deleted by the owner thereof may be transferred to the data processing system itself in view of the fact that since the document no longer has a designated owner within the system. Alternatively, resource responsibility for a document which has been deleted by its owner may be transferred to any user who has designated that document as a retained document. In this manner, charges for Direct Access Storage Devices (DASD) may be levied against those users who have designated the document as a retained document. This will effectively limit the designation of a large number of documents as retained documents for a user due to the fact that such a user will be required to take responsibility for DASD charges associated with those documents. Thereafter, the process again terminates as illustrated in block 50.

Referring again to block 44, in the event the operation selected for an accessed document is not a delete operation, block 56 illustrates a determination of whether or not the activity taking place indicates that the access authority for the document in question is being altered. If not, the process returns iteratively to block 42 to await the accessing of a subsequent document. If the access authority for the current document is being altered, as determined in block 56, then block 58 illustrates a determination of whether or not the document in question has been designated as a retained document by any user within the data processing system. If not, the process returns iteratively to block 42 to await the accessing of a subsequent document.

If, as determined in blocks 56 and 58, the access authority of a document which has been designated as a retained document is being altered, block 60 illustrates a determination of whether or not the access authority of a user who has designated that document as a retained document is being changed such that the user's access authority has been revoked. If not, the process again returns to block 42 to await the accessing of a subsequent document.

However, as illustrated in block 62, in the event the access authority of a user who has designated the document in question as a retained document is being revoked, block 62 illustrates the automatic creation of a copy of that document and the storage of that copy in conjunction with the user's original access authority.

In this manner, a user who has once been permitted access authority to a selected document may designate that document as a retained document and ensure continued access to that document despite an attempted deletion of that document by the owner thereof or an attempted revocation of the user's access authority. After creating a copy of the document and storing the document in conjunction with the user's original access authority, the process again terminates, as illustrated in block 50.

With reference now to FIG. 3 there is depicted a pictorial representation of the status of a document A which is accessible by multiple users. The status of document A is illustrated at reference numeral 66 and, as is illustrated, includes three separate columns of information. Column 68 illustrates the listing of the identity of each user having access to document A. Column 70 illustrates the level of access authority each individual user enjoys with respect to document A and, in accordance with an important feature of the method of the present invention, column 72 depicts the illustration of the type of user for each identified user with regard to document A.

As illustrated in FIG. 3, User Bill has created document A and therefore enjoys ALL access authority. User Bill is designated, within column 72, as the owner of document A. As the owner of document A, User Bill has given Users Sam and Sue UPDATE authority for document A. Similarly, User Bill has granted Users Art, Ann and Tom READ authority for document A. That is, users Art, Ann and Tom may READ document A; however, they are not permitted to alter or update document A. Finally, Users Art, Ann and Tom have all been designated as READ authority. Referring to column 72 it may be seen that Users Sam, Sue, Art and Ann have all been designated as retainers for document A. That is, Users Sam, Sue, Art and Ann have all designated document A as a retained document for their purposes. User Tom is listed as an ordinary user and has not designated document A as a retained document.

Referring now to FIG. 4 there is illustrated a pictorial representation of the status of the document of FIG. 3 after an alteration of access authority to that document has occurred for selected users. As is illustrated, User Bill, the owner of document A has altered the access authority of document A such that Users Sam, Ann and Tom only enjoy READ authority for that document. Users Sue and Art have lost their access authority with regard to document A and no longer are permitted to access that document.

In accordance with an important feature of the present invention, upon the attempted revocation of the access authority of Users Sue and Art to document A, a copy of document A is automatically created. With reference now to FIG. 5, there is depicted a pictorial representation of the automatically created copy of document A. This new document, document B, which is a copy of document A, is created automatically due to the fact that Users Sue and Art had both previously designated document A as a retained document for their purposes. Thereafter, an attempted revocation of the access authority of users Sue and Art to document A has caused the automatic creation of the copy of document A which is illustrated at reference numeral 82.

It should be noted that since Users Sue and Art are no longer authorized to access the original document A they will not have access to subsequent updates of the original document A. After Users Sue and Art have revoked their access authority with regard to document A the copy created at reference numeral 82 will be automatically deleted from the system.

Referring now to FIG. 6 there is depicted a pictorial representation of the status of the document of FIG. 4 after an attempted deletion of that document by the owner thereof. As is illustrated at reference numeral 90, after User Bill, as the owner of document A, has attempted to delete document A, access to document A for Users Bill and Tom has been revoked. However, Users Sam and Ann continue to enjoy access to document A, having previously designated document A as a retained document for their purposes.

Upon references to the foregoing those ordinarily skilled in the art will appreciate that the Applicants in the present application have provided a method whereby a user, having once had access to a document stored within a data processing system, may designate that document as a retained document and continue to enjoy access to that document despite an attempted deletion of the document by the owner thereof or an attempted revocation of the user's access authority to that document. This method substantially enhances the user-friendliness of a data processing system in that a user who desires to retain a copy of a particular document may simply and efficiently do so, despite attempts to deny that access in the future.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method in a data processing system for efficiently managing access to a plurality of documents stored therein which are owned by at least one user and accessible by multiple users within said data processing system, said method comprising the steps of:

permitting a user to designate selected documents as retained documents for that user;

determining if a particular document has been designated as a retained document by said user in response to an attempted deletion of that document; and deleting access authority to said particular document for all users other than those users who have designated said particular document as a retained document in response to said attempted deletion of said particular document.

2. The method in a data processing system for efficiently managing access to a plurality of documents stored therein which are owned by at least one user and accessible by multiple users within said data processing system according to claim 1 further including the step of subsequently deleting all access authority to said particular document in response to an attempted deletion of said particular document by all users who have designated said particular document as a retained document.

3. A method in a data processing system for efficiently managing access to a plurality of documents stored therein which are owned by at least one user and accessible by multiple users within said data processing system according to claim 1, further including the step of transferring resource responsibility for said particular document to said data processing system in response to the deletion of access authority to said particular document for the owner thereof.

4. A method in a data processing system for efficiently managing access to a plurality of documents stored therein which are owned by at least one user and accessible by multiple users within said data processing system, said method comprising the steps of:
   permitting a user to designate selected documents as retained documents for that user;
   determining if a particular document has been designated as a retained document by said user in response to an attempted deletion of access authority for said user with regard to said particular document;
   automatically creating a copy of said particular document prior to a deletion of access authority for said user, if said particular document has been designated as a retained document by said user; and
   storing said automatically created copy of said particular document in conjunction with an unaltered access authority for said user.

5. The method in a data processing system for efficiently managing access to a plurality of documents stored therein which are owned by at least one user and accessible by multiple users within said data processing system according to claim 4 further including the step of subsequently deleting said automatically created copy of said particular document upon a revocation of access authority by said user.

6. A method in a data processing system for efficiently managing access to a plurality of documents stored therein which are owned by at least one user and accessible by multiple users within said data processing system according to claim 4, said method further including the step of transferring resource responsibility for said automatically created copy of said particular document to said user.

7. A data processing system for efficiently managing access to a plurality of documents stored therein which are owned by at least one user and accessible by multiple users within said data processing system, said data processing system comprising:
   means for permitting a user to designate selected documents as retained documents for that user;
   means for determining if a particular document has been designated as a retained document by any user in response to an attempted deletion of that document; and
   means for deleting access authority to said particular document for all users other than those users who have designated said particular document as a retained document in response to said attempted deletion of said particular document.

8. The data processing system for efficiently managing access to a plurality of documents stored therein according to claim 6, further including means for subsequently deleting all access authority to said particular document in response to an attempted deletion of said particular document in response to an attempted deletion of said particular document by all users who have designated said particular document as a retained document.

9. A data processing system for efficiently managing access to a plurality of documents stored therein which are owned by at least one user and accessible by multiple users within said data processing system, said data processing system comprising:
   means for permitting a user to designate selected documents as retained documents for that user;
   means for determining if a particular document has been designated as a retained document by said user in response to an attempted deletion of access authority for said user with regard to said particular document;
   means for automatically creating a copy of said particular document prior to a deletion of access authority for said user, if said particular document has been designated as a retained document by said user; and
   means for storing said automatically created copy of said particular document in conjunction with an unaltered access authority for said user.

10. A data processing system for efficiently managing access to a plurality of documents stored therein which are owned by at least one user and accessible by multiple users within said data processing system according to claim 9, further including means for transferer resource responsibility for said automatically created copy of said particular document to said user.

* * * * *